US012405936B2

(12) United States Patent
Lu

(10) Patent No.: US 12,405,936 B2
(45) Date of Patent: Sep. 2, 2025

(54) MESSAGE PROCESSING METHOD AND ELECTRONIC DEVICE

(71) Applicant: VIVO MOBILE COMMUNICATION CO., LTD., Guangdong (CN)

(72) Inventor: Yufeng Lu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/603,885

(22) Filed: Mar. 13, 2024

(65) Prior Publication Data
US 2024/0220469 A1 Jul. 4, 2024

Related U.S. Application Data

(63) Continuation of application No. PCT/CN2022/117796, filed on Sep. 8, 2022.

(30) Foreign Application Priority Data

Sep. 14, 2021 (CN) .......................... 202111083992.5

(51) Int. Cl.
*G06F 16/22* (2019.01)
(52) U.S. Cl.
CPC .............................. *G06F 16/2228* (2019.01)
(58) Field of Classification Search
CPC ............... G06F 16/2228; G06F 3/0481; G06F 3/04842; G06F 9/451; H04L 51/216; H04L 51/42; H04L 51/04; H04L 51/214
USPC ....................................................... 707/737
See application file for complete search history.

(56) References Cited

U.S. PATENT DOCUMENTS

| 10,254,956 B2 * | 4/2019 | Chaoudhri et al. .......................... G06F 17/2288 |
| 2014/0195921 A1 * | 7/2014 | Grosz ................ G06Q 30/0631 715/738 |
| 2017/0255889 A1 * | 9/2017 | Jones ............... G06Q 10/06311 |
| 2018/0083898 A1 * | 3/2018 | Pham ..................... H04L 51/046 |
| 2018/0083901 A1 * | 3/2018 | McGregor, Jr. ......... H04L 51/02 |
| 2018/0210874 A1 * | 7/2018 | Fuxman ................. G06N 3/045 |
| 2018/0239495 A1 | 8/2018 | Sharifi et al. |
| 2018/0367483 A1 * | 12/2018 | Rodriguez ............ H04L 51/046 |
| 2020/0364397 A1 * | 11/2020 | Jon et al. ............... G06F 40/169 |
| 2022/0385603 A1 * | 12/2022 | Aher et al. ............ H04L 51/046 |

(Continued)

FOREIGN PATENT DOCUMENTS

| CN | 101110787 A | 1/2008 |
| CN | 110268428 A | 9/2019 |
| CN | 110457093 A | 11/2019 |

(Continued)

*Primary Examiner* — Neveen Abel Jalil
(74) *Attorney, Agent, or Firm* — The Webb Law Firm

(57) ABSTRACT

A message processing method includes displaying a message aggregation interface corresponding to a session interface, where the message aggregation interface includes a plurality of messages classified and displayed based on a message type, and the plurality of messages are all messages in the session interface; receiving a first input of a user for at least one first message in the plurality of messages; in response to the first input, selecting the at least one first message; receiving a second input of the user; and in response to the second input, performing a target operation on the at least one first message, where the target operation corresponds to the second input.

20 Claims, 12 Drawing Sheets

(56) References Cited

U.S. PATENT DOCUMENTS

2023/0037770 A1\* 2/2023 Dorogusker et al. .................... H04N 21/2743

FOREIGN PATENT DOCUMENTS

| CN | 110888707 A | 3/2020 |
| --- | --- | --- |
| CN | 110913067 A | 3/2020 |
| CN | 111555961 A | 8/2020 |
| CN | 112306592 A | 2/2021 |
| CN | 112350923 A | 2/2021 |
| CN | 112748844 A | 5/2021 |
| CN | 112764608 A | 5/2021 |
| CN | 112787907 A | 5/2021 |
| CN | 113055525 A | 6/2021 |
| CN | 113360238 A | 9/2021 |
| CN | 113918055 A | 1/2022 |
| CN | 114422463 A | 4/2022 |

\* cited by examiner

MESSAGE PROCESSING METHOD AND ELECTRONIC DEVICE

CROSS-REFERENCE TO RELATED APPLICATIONS

This application is a Bypass Continuation Application of International Patent Application No. PCT/CN2022/117796, filed Sep. 8, 2022, and claims priority to Chinese Patent Application No. 202111083992.5, filed Sep. 14, 2021, the disclosures of which are hereby incorporated by reference in their entireties.

BACKGROUND OF THE INVENTION

Field of the Invention

This application pertains to the field of communications technologies, and in particular, to a message processing method and an electronic device.

Description of Related Art

At present, electronic devices can forward, delete, and favorite messages in the session interface.

For example, message forwarding in the session of the electronic device is used as an example, when the user needs to forward at least two chat messages in a session interface a between the user and a chat object 1 to a chat object 2, the user can touch and hold any message in the session interface a to trigger the electronic device to display a multiple-selection control. After the user taps the multiple-selection control, the electronic device can display a plurality of selection identifiers, and each selection identifier is used to select a message in the session interface a. Then, the user needs to input identifiers corresponding to at least two messages to be selected, to trigger the electronic device to select the at least two messages and forward the at least two messages to the chat object 2.

However, in the above method, at least two messages in one session interface can be selected only after the foregoing series of operations are performed, so the processing process of messages in the session interface is time-consuming and cumbersome.

SUMMARY OF THE INVENTION

According to a first aspect, an embodiment of this application provides a message processing method, and the method includes: displaying a message aggregation interface corresponding to a session interface, where the message aggregation interface includes a plurality of messages classified and displayed based on a message type, and the plurality of messages are all messages in the session interface; receiving a first input of a user for at least one first message in the plurality of messages; in response to the first input, selecting the at least one first message; receiving a second input of the user; and in response to the second input, performing a target operation on the at least one first message.

According to a second aspect, an embodiment of this application provides a message processing apparatus. The apparatus includes a display module, a receiving module, and a processing module, where the display module is configured to display a message aggregation interface corresponding to a session interface, the message aggregation interface includes a plurality of messages classified and displayed based on a message type, and the plurality of messages are all messages in the session interface; the receiving module is configured to receive a first input of a user for at least one first message in the plurality of messages; the processing module is configured to select the at least one first message in response to the first input; the receiving module is further configured to receive a second input of the user; and the processing module is further configured to: in response to the second input, perform a target operation on the at least one first message.

According to a third aspect, an embodiment of this application provides an electronic device. The electronic device includes a processor, a memory, and a program or an instruction stored in the memory and executable on the processor, where when the program or the instruction is executed by the processor, steps of the method according to the first aspect are implemented.

According to a fourth aspect, an embodiment of this application provides a non-transitory readable storage medium. The non-transitory readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction to implement the method according to the first aspect.

DESCRIPTION OF THE INVENTION

Figure 1:
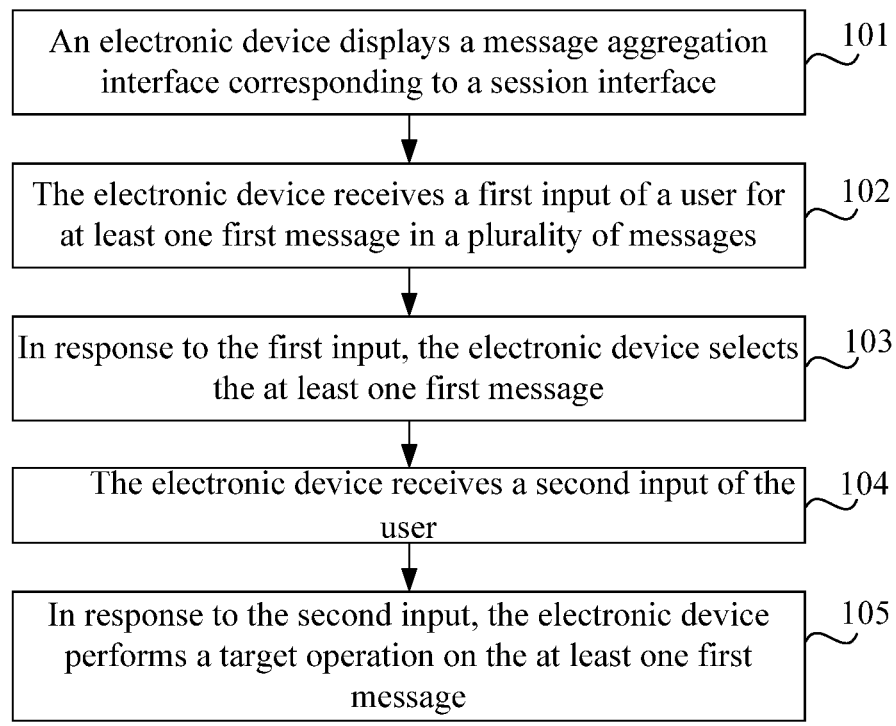
FIG. 1 is a schematic diagram of a message processing method according to an embodiment of this application.

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

It should be noted that the identifier in this embodiment of this application is used to indicate a character, a symbol, an image, and the like of information. A control or another container may be used as a carrier for displaying the information, including but not limited to a character identifier, a symbol identifier, and an image identifier.

The following describes the message processing method and apparatus, and the electronic device provided in the embodiments of this application through embodiments and application scenarios thereof with reference to the accompanying drawings.

The message processing method provided in the embodiments of this application can be applied to a scenario in which messages in the session interface are processed.

For example, the electronic device can display a message aggregation interface corresponding to the session interface, the message aggregation interface includes a plurality of messages classified and displayed based on a message type, and the plurality of messages are all messages in the session interface. Therefore, the user can trigger the electronic device to select the one or more messages through the input of one or more messages in the message aggregation interface. After selecting these messages, the user can trigger the electronic device to perform, through another input (for example, the second input in the embodiments of this application), a target operation corresponding to the second input on these selected messages. In this way, the user can trigger the electronic device to select one or more messages in the session interface by inputting messages in the message aggregation interface corresponding to the session interface, and perform related operations on the selected messages, without sequentially selecting messages in the session interface before performing an operation on the selected messages, so that the processing process of the messages in the session interface can be simplified.

As shown in FIG. 1, an embodiment of this application provides a message processing method, and the method may include the following step 101 to step 105.

Step 101. An electronic device displays a message aggregation interface corresponding to a session interface.

The message aggregation interface includes a plurality of messages classified and displayed based on a message type, and the plurality of messages are all messages in the session interface.

Figure 2A:
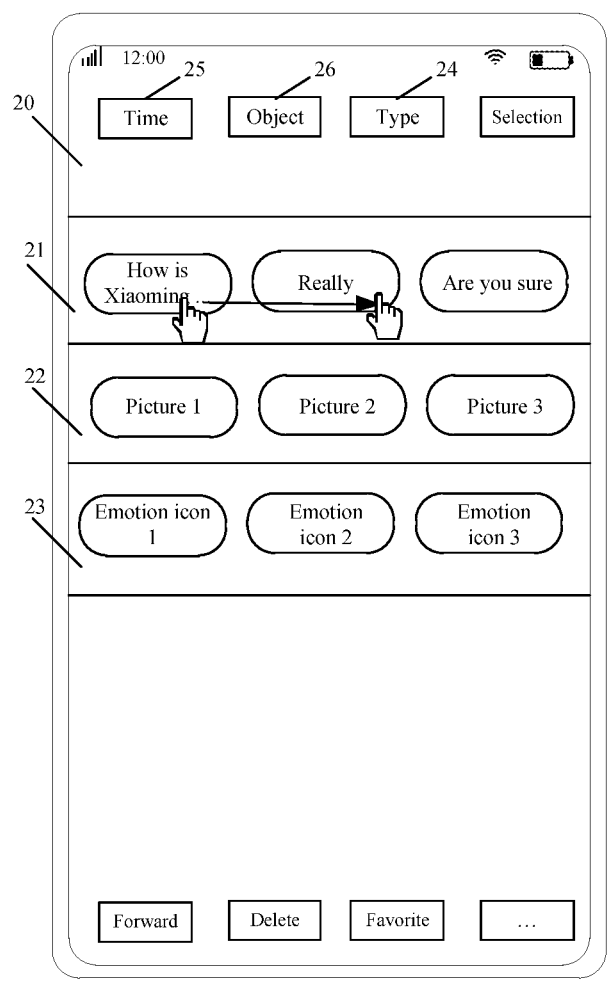
FIG. 2A is a first schematic diagram of an interface of a message processing method according to an embodiment of this application.

For example, as shown in FIG. 2A, the electronic device can display a text message from the session interface in a first area 21 of the message aggregation interface 20, and the text message in the session interface includes: "How is Xiaoming . . . ", "Really", and "Are you sure". The electronic device can display a picture message from the session interface in a second area 22 of the message aggregation interface 20, and the picture message in the session interface includes "Picture 1", "Picture 2", and "Picture 3". The electronic device can display an emotion icon message from the session interface in a third area 23 of the message aggregation interface 20, and the emotion icon message in the session interface includes "Emotion icon 1", "Emotion icon 2", and "Emotion icon 3".

Optionally, in this embodiment of this application, the electronic device can display different types of messages in different areas in the message aggregation interface.

Optionally, in this embodiment of this application, the session interface may be a session interface between the user and a contact, or a session interface between the user and a group. This is not limited in this embodiment of this application.

Optionally, in this embodiment of this application, because a display size of the message aggregation interface is limited, some of the plurality of messages may be in a display state, and other messages in the plurality of messages may be in a hidden state. In other words, the message aggregation interface can display some messages in the session interface at a time, and the user can trigger the electronic device to update messages displayed in the message aggregation interface by a sliding input on the message aggregation interface, so as to display the messages not displayed in the session interface.

Optionally, in this embodiment of this application, the above message type can be a text type, a picture type, a video type, an emotion icon type, a voice type, and the like, which can be determined according to the actual use requirements, and is not limited in this embodiment of this application.

In order to more clearly describe the message processing method provided in this embodiment of this application, in the following embodiment, the message in the text type is referred to as a text message, the message in the picture type is referred to as a picture message, the message in the video type is referred to as a video message, the message in the emotion icon type is referred to as an emotion icon message, and the message in the voice type is referred to as a voice message.

Optionally, in this embodiment of this application, the electronic device can sort each type of message based on a size of the memory occupied by the message, the time for receiving/sending the message, and/or the object for sending the message, which is not limited in this embodiment of this application.

Optionally, in this embodiment of this application, the plurality of messages can be displayed in a preset display form, and the preset display form can include a thumbnail form and a message digest form.

For example, as for each of the plurality of messages, i: if a message is a text message, the electronic device obtains a digest of the text message, so that the electronic device can display the digest of the text message on the message aggregation interface, that is, the electronic device displays the text message in the form of message digest.

The digest of the text message can be key information in the text message.

Alternatively, the digest of the text message can be a character in a preset position of the text message, for example, the digest of the text message can be first a characters and/or last b characters in the text message, and both a and b are positive integers.

ii: If a message is an image message, an emotion icon message, or a video message, the electronic device can display a thumbnail of the message on the message aggregation interface, that is, the electronic device displays the image message, the emotion icon message, and the video message in the form of thumbnail.

iii: If a message is a voice message, the electronic device can display a thumbnail voice identifier of the voice message on the message aggregation interface, that is, the electronic device displays the voice message in the form of thumbnail.

Optionally, in this embodiment of this application, the user can input (for example, a touch and hold input) a message in the message aggregation interface to trigger the electronic device to display all pieces of content of the message.

Optionally, in this embodiment of this application, the message aggregation interface further includes at least one label, and each label corresponds to a kind of related information of a message. The kind of related information may include any one of the following: a type of the message, a time range for receiving/sending the message, and an object for sending the message.

For the description of the type of the message, refer to the related description of the type of the message in step 101. To avoid repetition, details are not described herein again.

Optionally, in this embodiment of this application, the at least one label may be a type label 24, a time label 25, an object label 26, or the like, which is not limited in this embodiment of this application.

The type label 24 may correspond to the type of the message, the time label 25 may correspond to the time range for receiving/sending the message, and the object label 26 may correspond to the object for sending the message.

Step 102. The electronic device receives a first input of a user for at least one first message in the plurality of messages.

Step 103. In response to the first input, the electronic device selects the at least one first message.

Optionally, in this embodiment of this application, the first input may be a touch input (such as tapping and sliding), a floating input, a preset gesture input, or a voice input.

Optionally, in this embodiment of this application, that the electronic device receives a first input of a user for at least one first message in the plurality of messages may include at least one of the following: in one implementation, receiving the input of the user for one or more messages among the plurality of messages displayed on the message aggregation interface, or in another implementation, receiving the input of the user for one or more labels displayed on the message aggregation interface.

The following separately describes the one implementation and the another implementation in details.

One Implementation

Optionally, in this embodiment of this application, the first input may be a tapping input of the user on the at least one first message, or may be a sliding input of the user on the at least one first message.

Figure 2B:
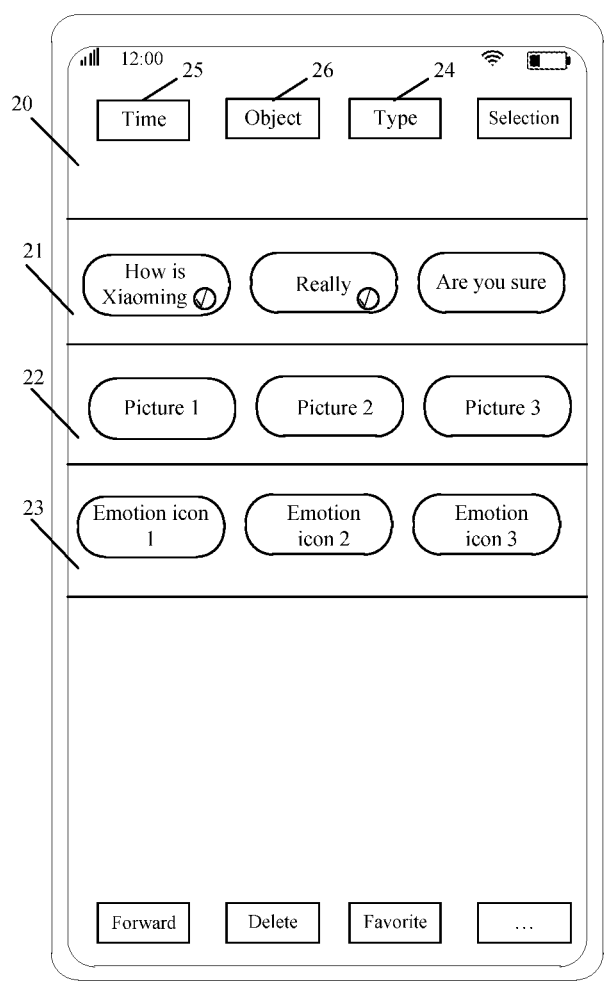
FIG. 2B is a second schematic diagram of an interface of a message processing method according to an embodiment of this application.

For example, in an implementation, as shown in FIG. 2A, the electronic device displays a message aggregation interface 20 corresponding to the session interface, and the message aggregation interface 20 includes a plurality of messages classified and displayed based on a message type, such as text messages: "How is Xiaoming . . . " and "Really". The user can slide on "How is Xiaoming . . . " and "Really" (namely, the first input). Then, as shown in FIG. 2B, the electronic device marks the message of "How is Xiaoming . . . " and the message of "Really" to inform the user that the two messages have been selected.

Another Implementation

Optionally, in this embodiment of this application, when the input of the user for one or more labels displayed on the message aggregation interface is received, the first input may include a first sub-input and a second sub-input. Step 103 may be implemented by using the following step 103a and step 103b.

Step 103a. In response to the first sub-input of the user for a target label among the at least one label, the electronic device displays a plurality of sub-labels corresponding to the target label.

Each sub-label is used to indicate at least one second message among the plurality of messages, pieces of target-related information of different second messages are the same, and the target-related information corresponds to the target label.

For description of the target-related information, refer to related description of the related information in the foregoing embodiment.

It should be noted that in this embodiment of this application, that the target-related information corresponds to the target label can be understood as: the target label is used to group messages (for example, the plurality of messages) based on the target-related information.

For example, if the session interface includes messages sent by 3 objects, an input of the user for the object label (namely, the target label) can trigger the electronic device to divide the messages in the session interface into 3 groups based on objects for sending the messages, and display 3 member labels (namely, a plurality of sub-labels corresponding to the target label). Each sub-label is used to indicate all messages (namely, at least one second message) sent by one member in the session interface, and target-related information of the at least one second message is this member.

The following describes step 103 with reference to examples.

For example, the input of the user for the object label 26 (namely, the target label) can trigger the electronic device to display labels of all members included in the session interface (namely, a plurality of sub-labels corresponding to the target label), and each sub-label is used to indicate all messages sent by one member in the session interface.

It can be understood that when the session interface is a session interface between the user and a contact, members included in the session interface include the user and the contact.

For another example, the input of the user for the type label 24 may trigger the electronic device to display labels of all types of messages included in the session interface (namely, a plurality of sub-labels corresponding to the target label), and each sub-label is used to indicate a type of message in the session interface.

For another example, the input of the user for the time label 25 may trigger the electronic device to display a plurality of time sub-labels, and each sub-label indicates messages sent and/or received within a time range in the session interface.

Optionally, in this embodiment of this application, the time range corresponding to each sub-label can be: one month, one day, or one hour, which can be determined according to the actual use requirements.

Step 103b. In response to the second sub-input of the user for at least one of the plurality sub-label of sub-labels, the electronic device selects the at least one first message.

The at least one first message is all messages indicated by the at least one sub-label.

The following describes another implementation with reference to examples.

Figure 3A:
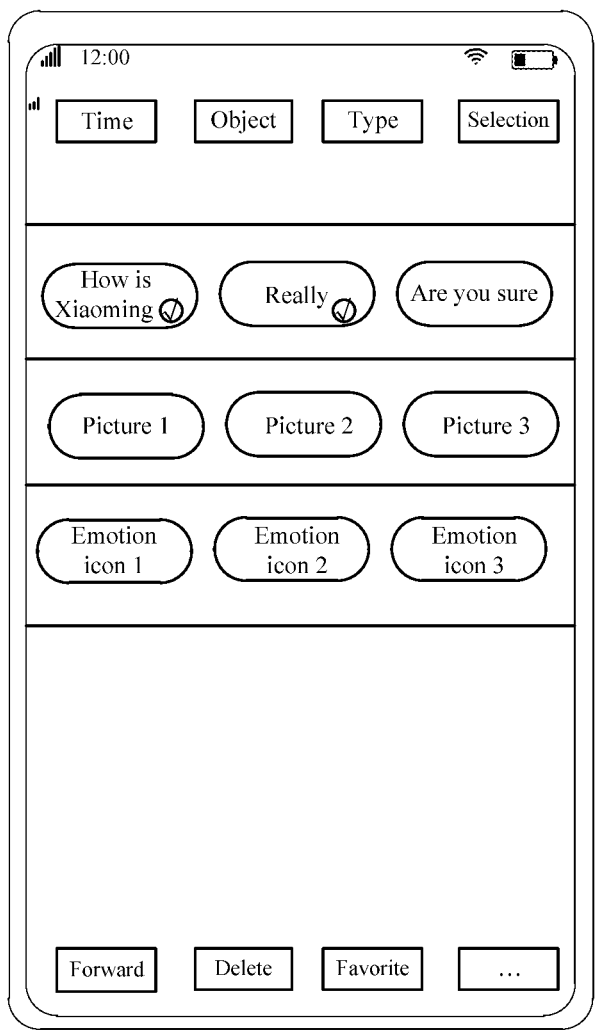
FIG. 3A is a third schematic diagram of an interface of a message processing method according to an embodiment of this application.
Figure 3B:
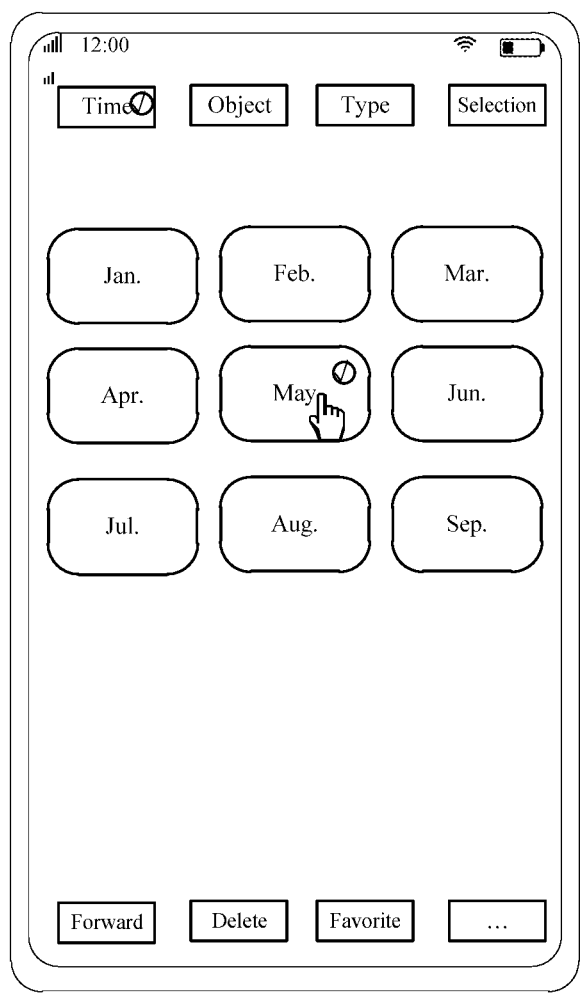
FIG. 3B is a fourth schematic diagram of an interface of a message processing method according to an embodiment of this application.

For example, as shown in FIG. 3A, the electronic device displays a message aggregation interface 20 corresponding to the session interface A, and the message aggregation interface 20 includes a plurality of messages classified and displayed based on a message type, a type label 24, a time label 25, and an object label 26. In this case, if the user taps (namely, the first sub-input) on the time label 25 (namely, the target label), as shown in FIG. 3B, the electronic device can display a plurality of month labels corresponding to time labels (namely, a plurality of sub-labels corresponding to the target label), and then the user can tap (namely, the second sub-input) on a "May" label (namely, at least one sub-label) among these month labels, to trigger the electronic device to select all messages received and/or sent in May in the session interface A. Optionally, in this embodiment of this application, in another implementation, when the target label is the time label 25, as for each of a plurality of sub-labels corresponding to the time label, if a time range corresponding to one sub-label is one month, the user can also input (for example, double-tap input) a target sub-label among the plurality of sub-labels, to trigger the electronic device to display a plurality of date labels corresponding to the target sub-label, and each date label is used to indicate messages sent or received in a day of a month corresponding to the target sub-label. In this way, the user can more accurately select messages sent and/or received on specific days in the session interface.

If the session interface includes a message received or sent on a date corresponding to a date label, the electronic device can display the date label in a first display manner; and if the session interface does not include a message received or sent on a date corresponding to a date label, the electronic device can display the date label in a second display manner, and the first display manner is different from the second display manner.

Figure 4:
FIG. 4 is a fifth schematic diagram of an interface of a message processing method according to an embodiment of this application.

For example, as shown in FIG. 3B, the electronic device displays a plurality of month labels corresponding to time labels (namely, a plurality of sub-labels corresponding to the target label), and then the user can double tap on the "May" label (namely, at least one sub-label) among these month labels. As shown in FIG. 4, the electronic device can display a specific date label corresponding to the "May" label, and then the user can tap on the "16th" label to trigger the electronic device to select all messages sent and received in the session interface on May 16th. Step 104. The electronic device receives a second input of the user.

Optionally, in this embodiment of this application, the second input may be a gesture input, a touch/mid-air input for a function control in the message aggregation interface, or a voice input, which can be determined according to the actual use requirements.

Optionally, in this embodiment of this application, when the second input is the touch/mid-air input for the function control in the message aggregation interface 20, the message aggregation interface may further include at least one function control, and each function control is used to trigger a processing function.

Optionally, in this embodiment of this application, the at least one function control may include a "forwarding" control, a "delete" control, a "favorite" control, and the like, which can be determined according to the actual use requirements.

The "forwarding" control is used to trigger the forward function, the "delete" control is used to trigger the delete function, and the "favorite" control is used to trigger the favorite function.

Step 105. In response to the second input, the electronic device performs a target operation on the at least one first message.

The target operation corresponds to the second input.

Optionally, in this embodiment of this application, if the second input is an input that the user taps the "forwarding" control, the electronic device can perform an operation of forwarding the at least one first message, for example, sending the at least one first message to at least one contact object; if the second input is an input of the user for the "delete" control, the electronic device can perform an operation of deleting the at least one first message; and if the second input is an input of the user for the "favorite" control, the electronic device can perform an operation of favoriting the at least one first message.

In the message processing method provided in the embodiments of this application, because the electronic device can display, on the message aggregation interface, all the messages in the session interface based on types of the messages, the user can select one or more messages in the session interface only by one input. Compared with the solution that only one message can be selected by one input in the conventional technology, the message processing method provided in the embodiments of this application can simplify the processing process of messages in the session interface.

Optionally, in this embodiment of this application, before step 101, the message processing method provided in this embodiment of this application may further include the following step 106 and step 107.

Step 106. The electronic device receives a third input of the user for identifiers of M contact objects.

M can be a positive integer.

Optionally, in this embodiment of this application, the contact object can be a contact or a contact group. This is not limited in this embodiment of this application.

Optionally, in this embodiment of this application, the identifiers of the M contact objects may be identifiers in a contact list interface.

Optionally, in this embodiment of this application, the second input may be a touch input of the user for the identifiers of the M contact objects (for example, a right sliding input on the identifiers of the M contact objects).

Step 107. The electronic device marks the M contact objects in response to the third input.

Optionally, in this embodiment of this application, the user can customize the color (for example, red, yellow, and the like) and the shape (for example, triangle, rectangle, and the like) of the mark, and the electronic device can display the mark on the identifier of the contact object or within a preset range of the identifier of the contact object, which is not limited in this embodiment of this application.

Figure 5:
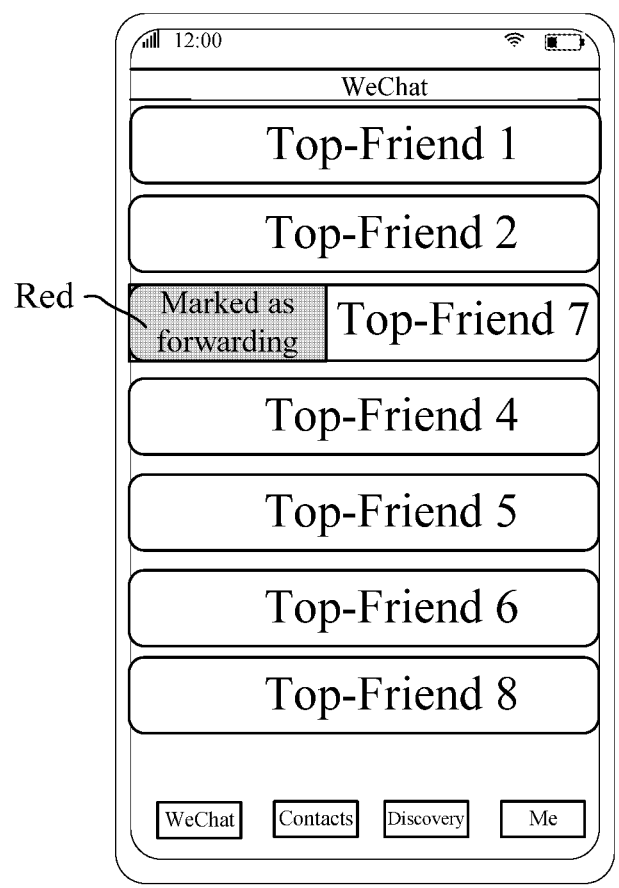
FIG. 5 is a sixth schematic diagram of an interface of a message processing method according to an embodiment of this application.

For example, as shown in FIG. 5, the user can slide to the right (namely, the third input) on the contact identifier of the contact object "Top-Friend 7" in the contact list interface, to trigger the electronic device to mark the contact identifier of the contact object "Top-Friend 7" in red (namely, the preset color).

Optionally, in this embodiment of this application, after the electronic device marks identifiers of the M contact objects, the electronic device may cancel marks on the identifiers of the M contact objects.

For example, the electronic device can cancel the marks on the identifiers of the M contact objects under the trigger of the user, or the electronic device can automatically cancel the marks on the identifiers of the M contact objects after a preset time after marking the identifiers of the M contact objects.

In this embodiment of this application, the electronic device can mark the identifier of the contact object selected by the user, so as to facilitate the user to quickly find the object to be operated in the subsequent operation and simplify the operation of the user.

Optionally, in this embodiment of this application, when the target operation is to send at least one first message to at least one contact object, the second input may include a third sub-input and a fourth sub-input. Step 105 may be implemented by using the following step 105a and step 105b.

Step 105a. In response to the third sub-input of the user for a forwarding control in the message aggregation interface, the electronic device displays an object selection interface.

The object selection interface may include identifiers of N contact objects. The N contact objects may include the M contact objects, and the M contact objects may include the at least one contact object, where N is a positive integer, and N is greater than or equal to M.

Optionally, in this embodiment of this application, the identifiers (marked) of the M contact objects can be displayed in the object selection interface in a decentralized or centralized manner.

Optionally, in this embodiment of this application, the object selection interface may include a contact list (manner 1) or a plurality of contact lists (manner 2).

Optionally, in this embodiment of this application, in the manner 1, the object selection interface may include a first contact list, and the first contact list may be a recent forwarding list, a recent chatting list, a marked forwarding list (including the identifiers of the M contact objects), and the like. The first contact list may be the default of the electronic device, or may be preset by the user, which is not limited in this embodiment of this application.

Figure 6A:
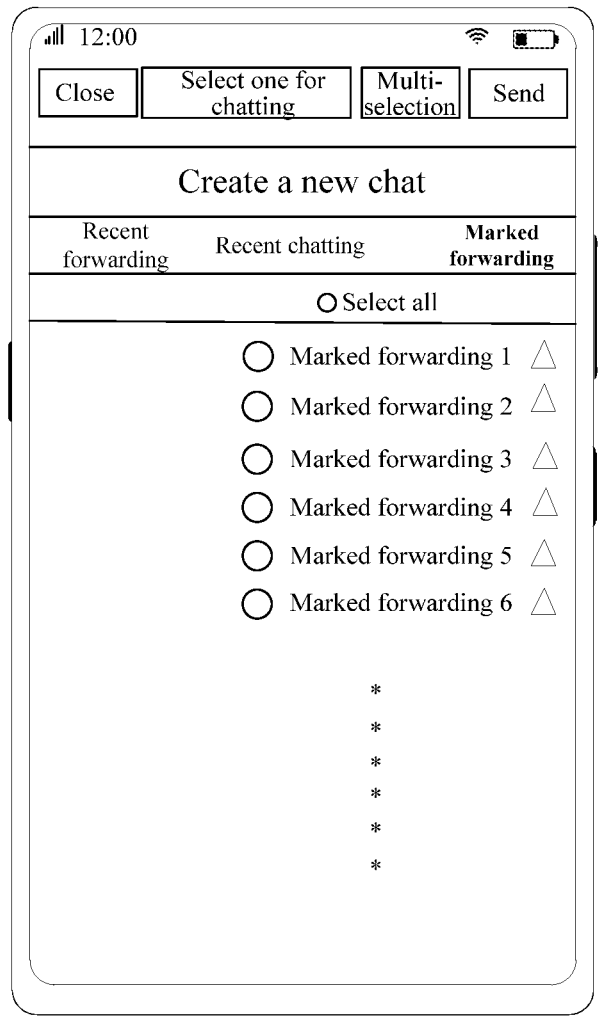
FIG. 6A is a seventh schematic diagram of an interface of a message processing method according to an embodiment of this application.

For example, as shown in FIG. 4, the user taps on the "forwarding" control in the message aggregation interface 20, and as shown in FIG. 6A, the electronic device can display an object selection interface. The object selection interface includes a marked forwarding list, and an identifier of each contact object in the marked forwarding list corresponds to a triangle mark.

Optionally, in this embodiment of this application, in the manner 1, the object selection interface may further include a plurality of list identifiers, each list identifier is used to indicate one contact list, and the user can trigger update of the contact list in the object selection interface by inputting one of the plurality of list identifiers, for example, triggering update of the marked forwarding list (the first contact list) to a recent forwarding list.

Figure 6B:
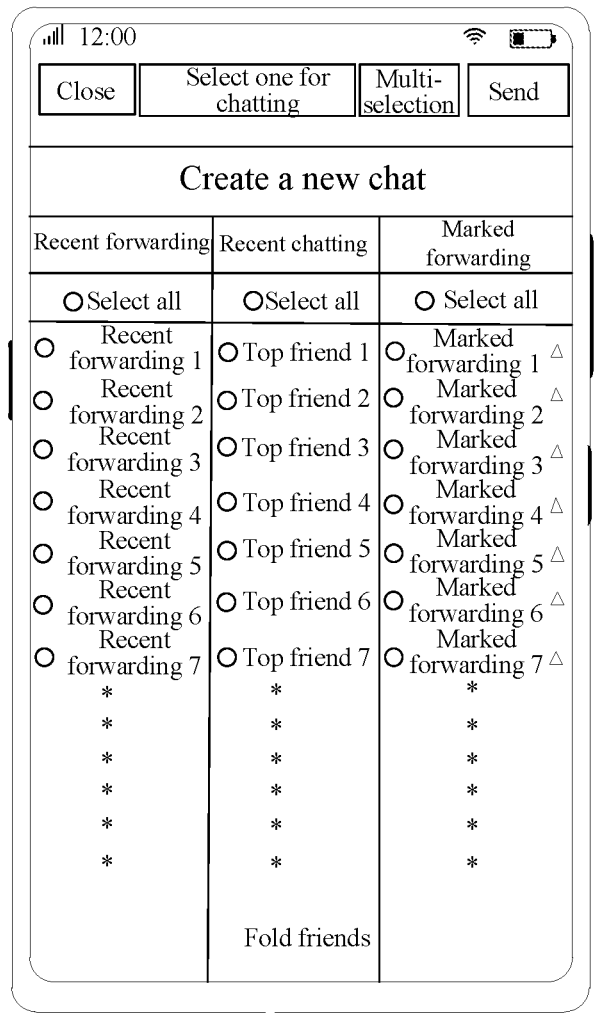
FIG. 6B is an eighth schematic diagram of an interface of a message processing method according to an embodiment of this application.

Optionally, in this embodiment of this application, in the manner 2, the object selection interface may include a plurality of contact lists. For example, as shown in FIG. 6B, the object selection interface may include a recent forwarding list, a recent chatting list, and a marked forwarding list.

For descriptions of the contact list, refer to the related descriptions of the first contact list in the manner 1. To avoid repetition, details are not described herein again.

Optionally, in this embodiment of this application, when the object selection interface includes the recent chatting list, the object selection interface may further include a "Fold Top Friends" control, and the "Fold Top Friends" control is used to fold identifiers of top contact objects in the recent chatting list.

Optionally, in this embodiment of this application, each contact list can correspond to a "Select All" control, and the user can input the "Select All" control to trigger the electronic device to select contact objects indicated by all identifiers in the contact list.

Optionally, in this embodiment of this application, each identifier in the object selection interface corresponds to a selection control, and the selection control is used to select a corresponding object.

Step 105b. In response to the fourth sub-input of the user for an identifier of the at least one contact object, the electronic device separately sends the at least one first message to the at least one contact object.

Optionally, in this embodiment of this application, the fourth sub-input may be an input of the user for the selection control corresponding to the identifier of the at least one contact object.

Optionally, in this embodiment of this application, when the at least one contact object is the M contact objects, the fourth sub-input can also be an input of the user for a "Select All" control corresponding to the marked forwarding list.

It should be noted that step 105a and step 105b are illustrated with the example that the user triggers the forwarding of at least one first message to the previously marked contact object. In actual implementation, the user can further trigger the forwarding of at least one first message to an unmarked contact object, that is, an identifier of the unmarked object can be selected, which can be determined according to the actual use requirements, and is not limited in this embodiment of this application.

In this embodiment of this application, when the user selects a message and needs to forward the message, the electronic device can display the forwarding object previously marked by the user, so that the message can be sent quickly and the operation of the user can be simplified.

Optionally, in this embodiment of this application, before step 101, the message processing method provided in this embodiment of this application may further include the following step 108 and step 109.

Step 108. The electronic device receives a fourth input of the user on the session interface.

Optionally, in this embodiment of this application, the fourth input can be an input of two fingers (or three fingers) of the user pinching in the session interface. This may be determined according to an actual use requirement, and is not limited in this embodiment of this application.

Step 109. Display the message aggregation interface in response to the fourth input.

Figure 7A:
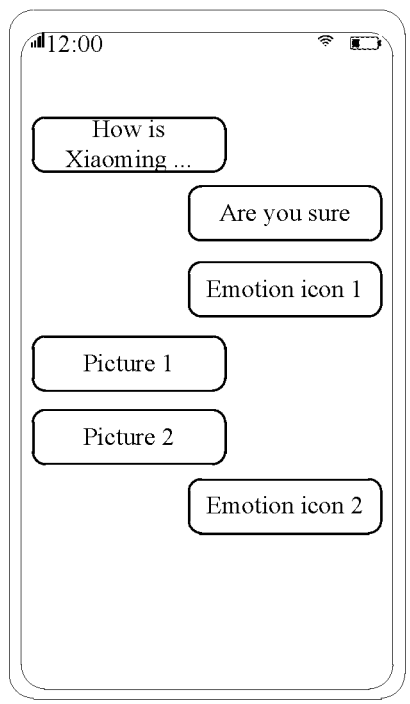
FIG. 7A is a ninth schematic diagram of an interface of a message processing method according to an embodiment of this application.
Figure 7B:
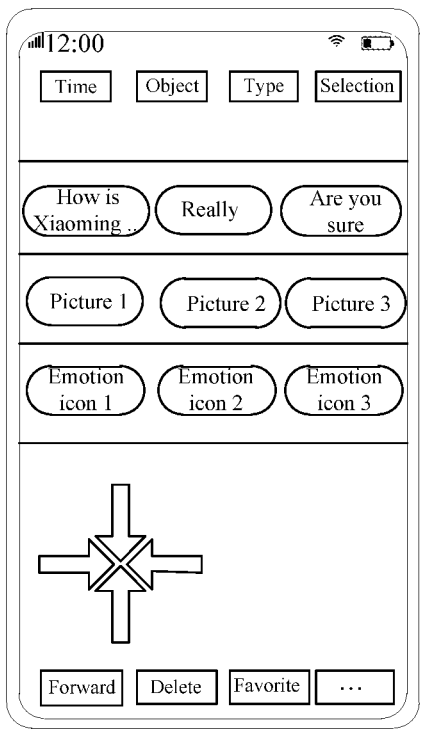
FIG. 7B is a tenth schematic diagram of an interface of a message processing method according to an embodiment of this application.

For example, as shown in FIG. 7A, the electronic device displays the session interface, and if the user performs a pinching input with two fingers on the session interface, then as shown in FIG. 7B, the electronic device can display the message aggregation interface.

Optionally, in this embodiment of this application, the electronic device can restore display of the session interface in response to a stretching input with two fingers of the user on the message aggregation interface.

Figure 7C:
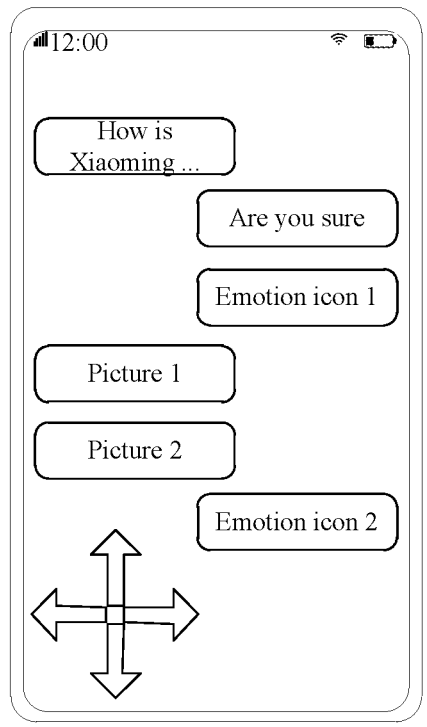
FIG. 7C is a eleventh schematic diagram of an interface of a message processing method according to an embodiment of this application.

For example, as shown in FIG. 7B, the electronic device displays the message aggregation interface, and if the user stretches two fingers on the message aggregation interface, then as shown in FIG. 7C, the electronic device can resume displaying the session interface.

In this embodiment of this application, when the user performs an input with two fingers pinching on the session interface, the electronic device can display the message aggregation interface, thus facilitating the selection of the user for messages and simplifying the operation of the user for selecting messages.

It should be noted that, the message processing method provided in this embodiment of this application may be performed by a message processing apparatus, or a control module in the message processing apparatus for executing the message processing method. In this embodiment of this application, an example in which the message processing apparatus performs the message processing method is used to describe the message processing apparatus provided in this embodiment of this application.

Figure 8:
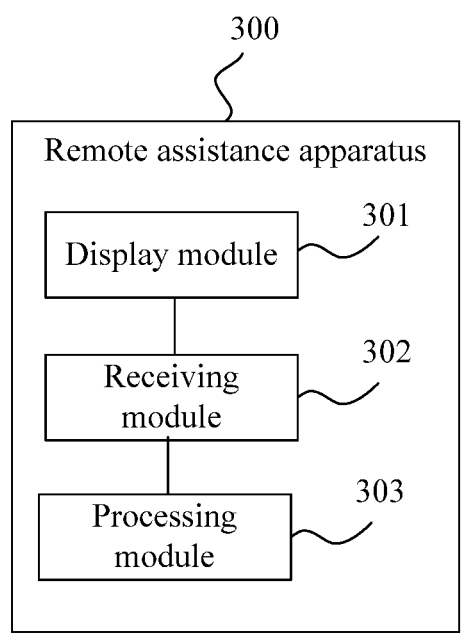
FIG. 8 is a schematic diagram of a structure of a message processing apparatus according to an embodiment of this application.

With reference to FIG. 8, an embodiment of this application provides a message processing apparatus 300. The message processing apparatus 300 may include a display module 301, a receiving module 302, and a processing module 303. The display module 301 is configured to display a message aggregation interface corresponding to a session interface, the message aggregation interface includes a plurality of messages classified and displayed based on a message type, and the plurality of messages are all messages in the session interface; the receiving module 302 is configured to receive a first input of a user for at least one first message in the plurality of messages; the processing module 303 is configured to select the at least one first message in response to the first input received by the receiving module 302; the receiving module 302 is further configured to receive a second input of the user; and the processing module 303 is further configured to: in response to the second input received by the receiving module 302, perform a target operation on the at least one first message, where the target operation corresponds to the second input.

Optionally, the message aggregation interface further includes at least one label, and each label corresponds to a kind of related information of a message; the first input includes a first sub-input and a second sub-input; the processing module 303 includes a display submodule and a processing submodule; the display submodule is configured to: in response to the first sub-input of the user for a target label among the at least one label, display a plurality of sub-labels corresponding to the target label, where each sub-label is used to indicate at least one second message among the plurality of messages, pieces of target-related information of different second messages are the same, and the target-related information corresponds to the target label; the processing submodule is configured to: in response to the second sub-input of the user for at least one sub-label of the plurality of sub-labels, select the at least one first message, where the at least one first message is all messages indicated by the at least one sub-label; and the kind of related information includes at least one of the following: a type of the message, a time range for receiving/sending the message, or an object for sending the message.

Optionally, the receiving module 302 is further configured to: before the display module 301 displays a message aggregation interface corresponding to a session interface, receive a third input of the user for identifiers of M contact objects, where M is a positive integer; and the processing module 303 is further configured to mark the M contact objects in response to the third input.

Optionally, the target operation is to separately send the at least one first message to at least one contact object; the second input includes a third sub-input and a fourth sub-input, and the processing module 303 includes a second display submodule and a second processing submodule; the second display submodule is configured to: in response to the third sub-input of the user for a forwarding control in the message aggregation interface, display an object selection interface, where the object selection interface includes identifiers of N contact objects, the N contact objects include the M contact objects, and the M contact objects include the at least one contact object; and the second processing submodule is configured to: in response to the fourth sub-input of the user for an identifier of the at least one contact object, separately send the at least one first message to the at least one contact object, where N is a positive integer, and N is greater than or equal to M.

Optionally, the receiving module 302 is further configured to: before the display module 301 displays a message aggregation interface corresponding to a session interface, receive a fourth input of the user on the session interface; and the display module 301 is further configured to display the message aggregation interface in response to the fourth input.

In the message processing apparatus provided in the embodiments of this application, because the apparatus can display, on the message aggregation interface, all the messages in the session interface based on types of the messages, the user can select one or more messages in the session interface only by one input. Compared with the solution that only one message can be selected by one input in the conventional technology, the message processing apparatus provided in the embodiments of this application can simplify the processing process of messages in the session interface.

For a beneficial effect of each implementation in this embodiment, refer to a beneficial effect of a corresponding implementation in the foregoing method embodiment. To avoid repetition, details are not described herein again.

The message processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), a teller machine, or a self-service machine. This is not limited in the embodiments of this application.

The message processing apparatus in this embodiment of this application may be an apparatus with an operating system. The operating system may be an Android operating system, an iOS operating system, or another possible operating system. This is not limited in this embodiment of this application.

The message processing apparatus provided in this embodiment of this application can implement processes implemented in the method embodiment of FIG. 1. To avoid repetition, details are not described herein again.

Figure 9:
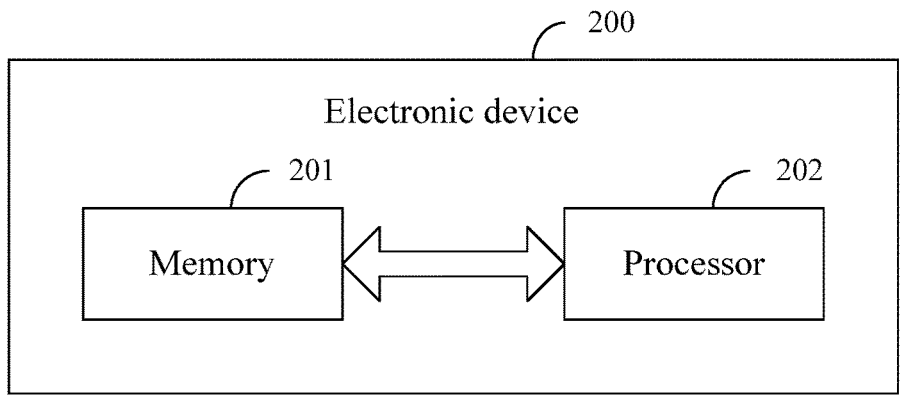
FIG. 9 is a schematic diagram of a structure of an electronic device according to an embodiment of this application.

As shown in FIG. 9, an embodiment of this application also provides an electronic device 200, including a processor 202, a memory 201, and a program or an instruction stored in the memory 201 and executable on the processor 202. When the program or the instruction is executed by the processor 202, the processes of the foregoing message processing method embodiments are implemented, and a same technical effect can be achieved. To avoid repetition, details are not repeated herein again.

It should be noted that the electronic device in this embodiment of this application includes the mobile electronic device and the non-mobile electronic device described above.

Figure 10:
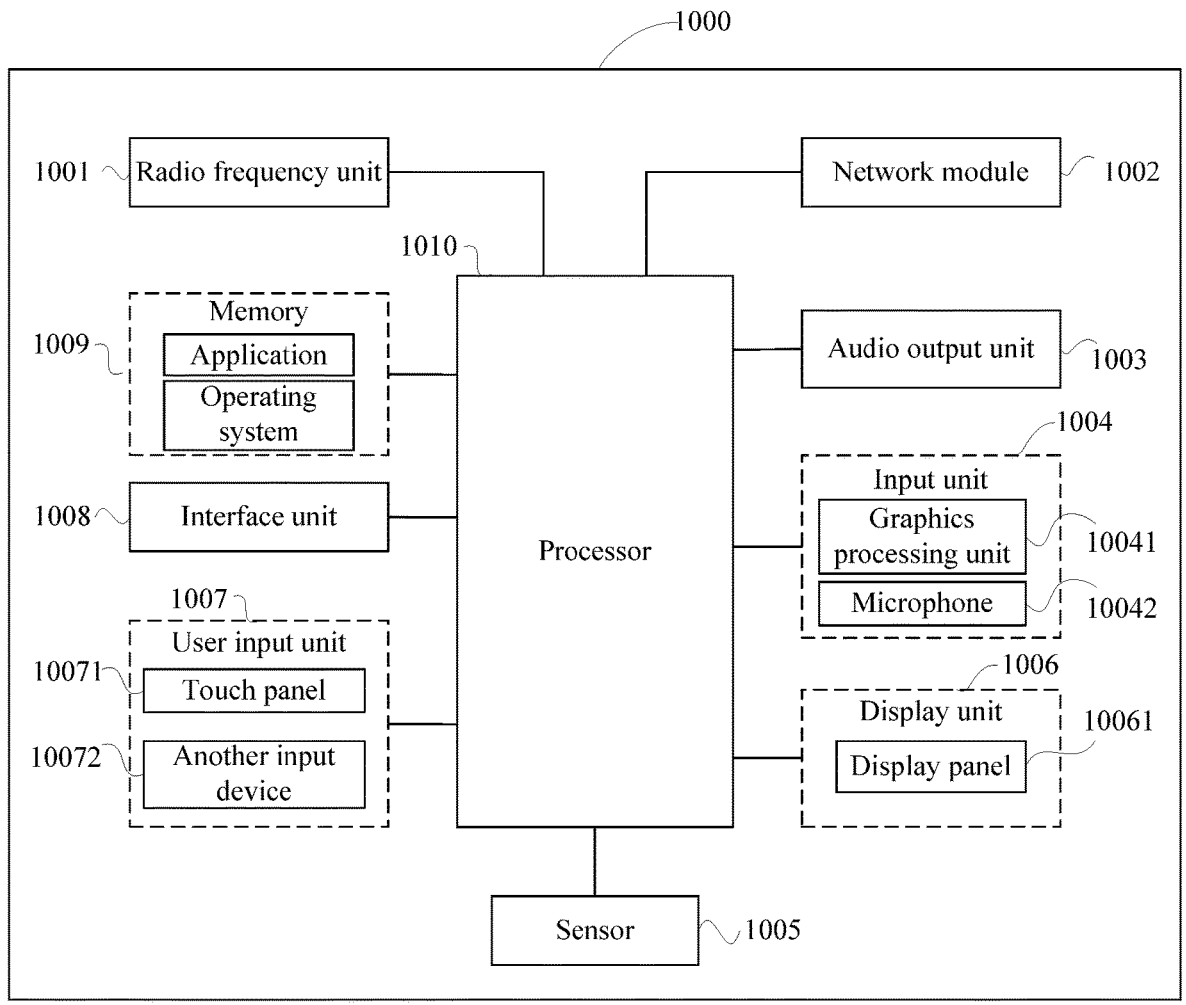
FIG. 10 is a schematic diagram of hardware of an electronic device according to an embodiment of this application.

FIG. 10 is a schematic diagram of a hardware structure of an electronic device according to an embodiment of this application.

The electronic device 1000 includes, but is not limited to: a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (such as a battery) that supplies power to each component. The power supply may be logically connected to the processor 1010 by using a power supply management system, to implement functions such as charging and discharging management, and power consumption management by using the power supply management system. The structure of the electronic device shown in FIG. 10 does not constitute a limitation on the electronic device. The electronic device may include components more or fewer than those shown in the diagram, a combination of some components, or different component arrangements. Details are not described herein.

The display unit 1006 is configured to display a message aggregation interface corresponding to a session interface, the message aggregation interface includes a plurality of messages classified and displayed based on a message type, and the plurality of messages are all messages in the session interface; the radio frequency unit 1001 is configured to receive a first input of a user for at least one first message in the plurality of messages; the processor 1010 is configured to select the at least one first message in response to the first input; the radio frequency unit 1001 is further configured to receive a second input of the user; and the processor 1010 is further configured to: in response to the second input, perform a target operation on the at least one first message, where the target operation corresponds to the second input.

Optionally, the message aggregation interface further includes at least one label, and each label corresponds to a kind of related information of a message; the first input includes a first sub-input and a second sub-input; the display unit 1006 is further configured to: in response to the first sub-input of the user for a target label among the at least one label, display a plurality of sub-labels corresponding to the target label, where each sub-label is used to indicate at least one second message among the plurality of messages, pieces of target-related information of different second messages are the same, and the target-related information corresponds to the target label; the processor 1010 is further configured to: in response to the second sub-input of the user for at least one sub-label of the plurality of sub-labels, select the at least one first message, where the at least one first message is all messages indicated by the at least one sub-label; and the kind of related information includes at least one of the following: a type of the message, a time range for receiving/sending the message, or an object for sending the message.

Optionally, the radio frequency unit 1001 is further configured to: before the display unit 1006 displays a message aggregation interface corresponding to a session interface, receive a third input of the user for identifiers of M contact objects, where M is a positive integer; and the processor 1010 is further configured to mark the M contact objects in response to the third input.

Optionally, the target operation is to separately send the at least one first message to at least one contact object; the second input includes a third sub-input and a fourth sub-input; the display unit 1006 is further configured to: in response to the third sub-input of the user for a forwarding control in the message aggregation interface, display an object selection interface, where the object selection interface includes identifiers of N contact objects, the N contact objects include the M contact objects, and the M contact objects include the at least one contact object; and the processor 1010 is further configured to: in response to the fourth sub-input of the user for an identifier of the at least one contact object, separately send the at least one first message to the at least one contact object, where N is a positive integer, and N is greater than or equal to M.

Optionally, the radio frequency unit 1001 is further configured to: before displaying a message aggregation interface corresponding to a session interface, receive a fourth input of the user on the session interface; and the processor 1010 is further configured to display the message aggregation interface in response to the fourth input.

In the electronic device provided in this embodiment of this application, because the electronic device can display, on the message aggregation interface, all the messages in the session interface based on types of messages, the user can select a plurality of messages through simple operations and trigger the electronic device to perform corresponding processing (for example, forwarding the selected messages, favoriting the selected messages, and the like), thus simplifying the operation on the messages in the session interface.

For a beneficial effect of each implementation in this embodiment, refer to a beneficial effect of a corresponding implementation in the foregoing method embodiment. To avoid repetition, details are not described herein again.

It should be understood that, in this embodiment of this application, the input unit 1004 may include a graphics processing unit (GPU) 10041 and a microphone 10042. The graphics processing unit 10041 processes image data of a static picture or a video obtained by an image capture apparatus (such as a camera) in a video capture mode or an image capture mode. The display unit 1006 may include a display panel 10061. Optionally, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application and an operating system. The processor 1010 may be integrated with an application processor and a modem processor. The application processor mainly processes an operating system, a user interface, an application, and the like. The modem processor mainly processes wireless communication. It can be understood that, alternatively, the modem processor may not be integrated into the processor 1010.

An embodiment of this application further provides a non-transitory readable storage medium. The non-transitory readable storage medium stores a program or an instruction, and when the program or the instruction is executed by a processor, the processes of the foregoing message processing method embodiment are performed and the same technical effects can be achieved. To avoid repetition, details are not described herein again.

The processor is the processor in the electronic device in the foregoing embodiment. The non-transitory readable storage medium includes a non-transitory computer-readable storage medium such as a read-only memory (ROM), a random access memory (RAM), a magnetic disk, an optical disc, or the like. An embodiment of this application further provides a chip. The chip includes a processor and a communications interface, the communications interface is coupled to the processor, and the processor is configured to run a program or an instruction to implement the processes of the foregoing message processing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A message processing method, wherein the method comprises:
   displaying a message aggregation interface corresponding to a session interface, wherein the message aggregation interface comprises a plurality of different messages classified and displayed based on a message type, and the plurality of different messages are all messages in the session interface;
   receiving a first input of a user for at least two first messages in the plurality of different messages;
   in response to the first input, selecting the at least two first messages;
receiving a second input of the user; and
in response to the second input, performing a target operation on the at least two first messages, wherein the target operation corresponds to the second input;
   wherein the second input comprises a third sub-input and a fourth sub-input; and
   receiving the second input of the user, and in response to the second input, performing the target operation on the at least two first messages comprises:
   receiving the third sub-input of the user for a forwarding button in the message aggregation interface;
   in response to the third sub-input, displaying an object selection interface, wherein the object selection interface comprises identifiers of N contact objects, the N contact objects comprise M contact objects, the M contact objects are previously marked contact objects before displaying the message aggregation interface, and the M contact objects comprise at least one contact object;
   receiving the fourth sub-input of the user for an identifier of the at least one contact object; and
in response to the fourth sub-input, separately sending the at least two first messages to the at least one contact object, wherein
N is a positive integer, and N is greater than or equal to M.

2. The method according to claim 1, wherein the message aggregation interface further comprises at least one label, and each label corresponds to a kind of related information of a message; and
   the first input comprises a first sub-input and a second sub-input;
in response to the first input, the selecting the at least two first messages comprises:
   in response to the first sub-input of the user for a target label among the at least one label, displaying a plurality of sub-labels corresponding to the target label, wherein each sub-label is used to indicate at least one second message among the plurality of messages, pieces of target-related information of different second messages are same, and the target-related information corresponds to the target label; and in response to the second sub-input of the user for at least one sub-label of the plurality of sub-labels, selecting the at least two first messages, wherein the at least two first messages are all messages indicated by the at least one sub-label; and the related information comprises at least one of the following:
a type of the message, a time range for receiving/sending the message, or an object for sending the message.

3. The method according to claim 1, wherein before the displaying a message aggregation interface corresponding to a session interface, the method further comprises: receiving a fourth input of the user on the session interface; and
the displaying a message aggregation interface corresponding to a session interface comprises: displaying the message aggregation interface in response to the fourth input.

4. The method according to claim 3, wherein the fourth input is an input of two fingers or three fingers of the user pinching in the session interface.

5. The method according to claim 3, wherein the method further comprises:
restoring display of the session interface in response to a stretching input with two fingers of the user on the message aggregation interface.

6. The method according to claim 1, wherein a color and a shape of a mark of a contact object are customized; or
the mark of the contact object is displayed on an identifier of the contact object or within a preset range of the identifier of the contact object.

7. The method according to claim 1, wherein marks on the identifiers of the M contact objects are canceled under a trigger of the user, or
the marks on the identifiers of the M contact objects are automatically canceled after a preset time after marking the identifiers of the M contact objects.

8. An electronic device, comprising a processor, a memory, and a program or an instruction stored in the memory and executable on the processor, wherein the program or the instruction, when executed by the processor, causes the electronic device to perform:
displaying a message aggregation interface corresponding to a session interface, wherein the message aggregation interface comprises a plurality of different messages classified and displayed based on a message type, and the plurality of different messages are all messages in the session interface; receiving a first input of a user for at least two first messages in the plurality of different messages;
in response to the first input, selecting the at least two first messages;
receiving a second input of the user; and
in response to the second input, performing a target operation on the at least two first messages, wherein the target operation corresponds to the second input;
receiving the third sub-input of the user for a forwarding button in the message aggregation interface;
in response to the third sub-input, displaying an object selection interface, wherein the object selection interface comprises identifiers of N contact objects, the N contact objects comprise M contact objects, the M contact objects are previously marked contact objects before displaying the message aggregation interface, and the M contact objects comprise at least one contact object;
receiving the fourth sub-input of the user for an identifier of the at least one contact object; and in response to the fourth sub-input, separately sending the at least two first messages to the at least one contact object, wherein N is a positive integer, and N is greater than or equal to M.

9. The electronic device according to claim 8, wherein the message aggregation interface further comprises at least one label, and each label corresponds to related information of a message; and
the first input comprises a first sub-input and a second sub-input;
the program or the instruction, when executed by the processor, causes the electronic device to perform:
in response to the first sub-input of the user for a target label among the at least one label, displaying a plurality of sub-labels corresponding to the target label, wherein each sub-label is used to indicate at least one second message among the plurality of messages, pieces of target-related information of different second messages are same, and the target-related information corresponds to the target label; and
in response to the second sub-input of the user for at least one sub-label of the plurality of sub-labels, selecting the at least two first messages, wherein the at least two first messages are all messages indicated by the at least one sub-label; and
the related information comprises at least one of the following:
a type of the message, a time range for receiving/sending the message, or an object for sending the message.

10. The electronic device according to claim 8, wherein the program or the instruction, when executed by the processor, causes the electronic device to further perform:
receiving a fourth input of the user on the session interface; and
the displaying a message aggregation interface corresponding to a session interface comprises: displaying the message aggregation interface in response to the fourth input.

11. The electronic device according to claim 10, wherein the fourth input is an input of two fingers or three fingers of the user pinching in the session interface.

12. The electronic device according to claim 10, wherein the program or the instruction, when executed by the processor, causes the electronic device to further perform:
restoring display of the session interface in response to a stretching input with two fingers of the user on the message aggregation interface.

13. The electronic device according to claim 8, wherein a color and a shape of a mark of a contact object are customized; or
the mark of the contact object is displayed on an identifier of the contact object or within a preset range of the identifier of the contact object.

14. The electronic device according to claim 8, wherein marks on the identifiers of the M contact objects are canceled under a trigger of the user, or
the marks on the identifiers of the M contact objects are automatically canceled after a preset time after marking the identifiers of the M contact objects.

15. A non-transitory readable storage medium, wherein the non-transitory readable storage medium stores a program or an instruction, and the program or the instruction, when executed by a processor of an electronic device, causes the electronic device to perform:
displaying a message aggregation interface corresponding to a session interface, wherein the message aggregation interface comprises a plurality of different messages classified and displayed based on a message type, and the plurality of different messages are all messages in the session interface; receiving a first input of a user for at least two first messages in the plurality of different messages;

in response to the first input, selecting the at least two first messages;

receiving a second input of the user; and in response to the second input, performing a target operation on the at least two first messages, wherein the target operation corresponds to the second input;

receiving the third sub-input of the user for a forwarding button in the message aggregation interface;

in response to the third sub-input, displaying an object selection interface, wherein the object selection interface comprises identifiers of N contact objects, the N contact objects comprise M contact objects, the M contact objects are previously marked contact objects before displaying the message aggregation interface, and the M contact objects comprise at least one contact object;

receiving the fourth sub-input of the user for an identifier of the at least one contact object; and in response to the fourth sub-input, separately sending the at least two first messages to the at least one contact object, wherein N is a positive integer, and N is greater than or equal to M.

16. The non-transitory readable storage medium according to claim 15, wherein the message aggregation interface further comprises at least one label, and each label corresponds to a kind of related information of a message; and the first input comprises a first sub-input and a second sub-input;

the program or the instruction, when executed by the processor, causes the electronic device to perform:

in response to the first sub-input of the user for a target label among the at least one label, displaying a plurality of sub-labels corresponding to the target label, wherein each sub-label is used to indicate at least one second message among the plurality of messages, pieces of target-related information of different second messages are same, and the target-related information corresponds to the target label; and in response to the second sub-input of the user for at least one sub-label of the plurality of sub-labels, selecting the at least two first messages, wherein the at least two first messages are all messages indicated by the at least one sub-label; and the kind of related information comprises at least one of the following:

a type of the message, a time range for receiving/sending the message, or an object for sending the message.

17. The non-transitory readable storage medium according to claim 15, wherein the program or the instruction, when executed by the processor, causes the electronic device to further perform:

receiving a fourth input of the user on the session interface; and the displaying a message aggregation interface corresponding to a session interface comprises: displaying the message aggregation interface in response to the fourth input.

18. The non-transitory readable storage medium according to claim 17, wherein the fourth input is an input of two fingers or three fingers of the user pinching in the session interface.

19. The non-transitory readable storage medium according to claim 15, wherein a color and a shape of a mark of a contact object are customized; or the mark of the contact object is displayed on an identifier of the contact object or within a preset range of the identifier of the contact object.

20. The non-transitory readable storage medium according to claim 15, wherein marks on the identifiers of the M contact objects are canceled under a trigger of the user, or the marks on the identifiers of the M contact objects are automatically canceled after a preset time after marking the identifiers of the M contact objects.

* * * * *